United States Patent
Lam

(10) Patent No.: US 7,178,019 B2
(45) Date of Patent: Feb. 13, 2007

(54) NETWORKED BASIC INPUT OUTPUT SYSTEM READ ONLY MEMORY

(75) Inventor: An H. Lam, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 428 days.

(21) Appl. No.: 10/712,355

(22) Filed: Nov. 13, 2003

(65) Prior Publication Data

US 2005/0108513 A1    May 19, 2005

(51) Int. Cl.
G06F 9/00 (2006.01)
G06F 9/24 (2006.01)
G06F 1/24 (2006.01)

(52) U.S. Cl. .............. 713/2; 713/1; 713/100
(58) Field of Classification Search .............. 713/1, 713/2, 100
See application file for complete search history.

(56) References Cited

U.S. PATENT DOCUMENTS

| | | | | |
|---|---|---|---|---|
| 5,230,052 A | * | 7/1993 | Dayan et al. | 713/2 |
| 5,280,627 A | * | 1/1994 | Flaherty et al. | 713/2 |
| 5,805,882 A | * | 9/1998 | Cooper et al. | 713/2 |
| 5,835,760 A | * | 11/1998 | Harmer | 713/2 |
| 5,974,547 A | * | 10/1999 | Klimenko | 713/2 |
| 5,987,605 A | * | 11/1999 | Hill et al. | 713/2 |
| 6,477,624 B1 | * | 11/2002 | Kedem et al. | 711/147 |
| 6,622,246 B1 | * | 9/2003 | Biondi | 713/100 |
| 6,633,976 B1 | * | 10/2003 | Stevens | 713/2 |
| 6,718,464 B2 | * | 4/2004 | Cromer et al. | 713/2 |
| 6,892,323 B2 | * | 5/2005 | Lin | 714/36 |
| 6,954,852 B2 | * | 10/2005 | Burokas et al. | 713/2 |
| 2002/0147941 A1 | * | 10/2002 | Gentile | 714/36 |
| 2002/0178242 A1 | * | 11/2002 | Eda | 709/222 |
| 2002/0194313 A1 | * | 12/2002 | Brannock | 709/220 |
| 2003/0236853 A1 | * | 12/2003 | Li et al. | 709/216 |
| 2004/0123093 A1 | * | 6/2004 | Rothman et al. | 713/2 |

* cited by examiner

Primary Examiner—Thomas Lee
Assistant Examiner—Ji H. Bae

(57) ABSTRACT

A system comprises a processor adapted to read BIOS code from a system ROM, a management controller coupled to the processor, and a network interface controller coupled to the management controller. The management controller selectively traps read accesses from the processor that target the system ROM and, in response, causes the network interface controller to load network BIOS code from storage external to the system during system initialization.

17 Claims, 2 Drawing Sheets

NETWORKED BASIC INPUT OUTPUT SYSTEM READ ONLY MEMORY

BACKGROUND

Many types of digital electronic machines (e.g., computers) include a local read only memory ("ROM") in which executable code is stored for use by the machine during an initialization process. The ROM and related circuitry may occupy an undesirable amount of space on a circuit board. Further, in systems having numerous computers coupled together in a network, managing the executable code stored in the ROMs of each computer can be problematic. For example, "flashing" the ROM (i.e., replacing some or all of the contents of the ROM) of each computer in a network having numerous computers can be an undesirably time-consuming and inefficient process.

BRIEF SUMMARY

In accordance with at least some embodiments of the invention, a system comprises a processor adapted to read BIOS code from a system ROM, a management controller coupled to said processor, and a network interface controller coupled to the management controller. The management controller selectively traps read accesses from the processor that target the system ROM and, in response, causes the network interface controller to load network BIOS code from storage external to the system during system initialization.

BRIEF DESCRIPTION OF THE DRAWINGS

For a detailed description of various embodiments of the invention, reference will now be made to the accompanying drawings in which.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
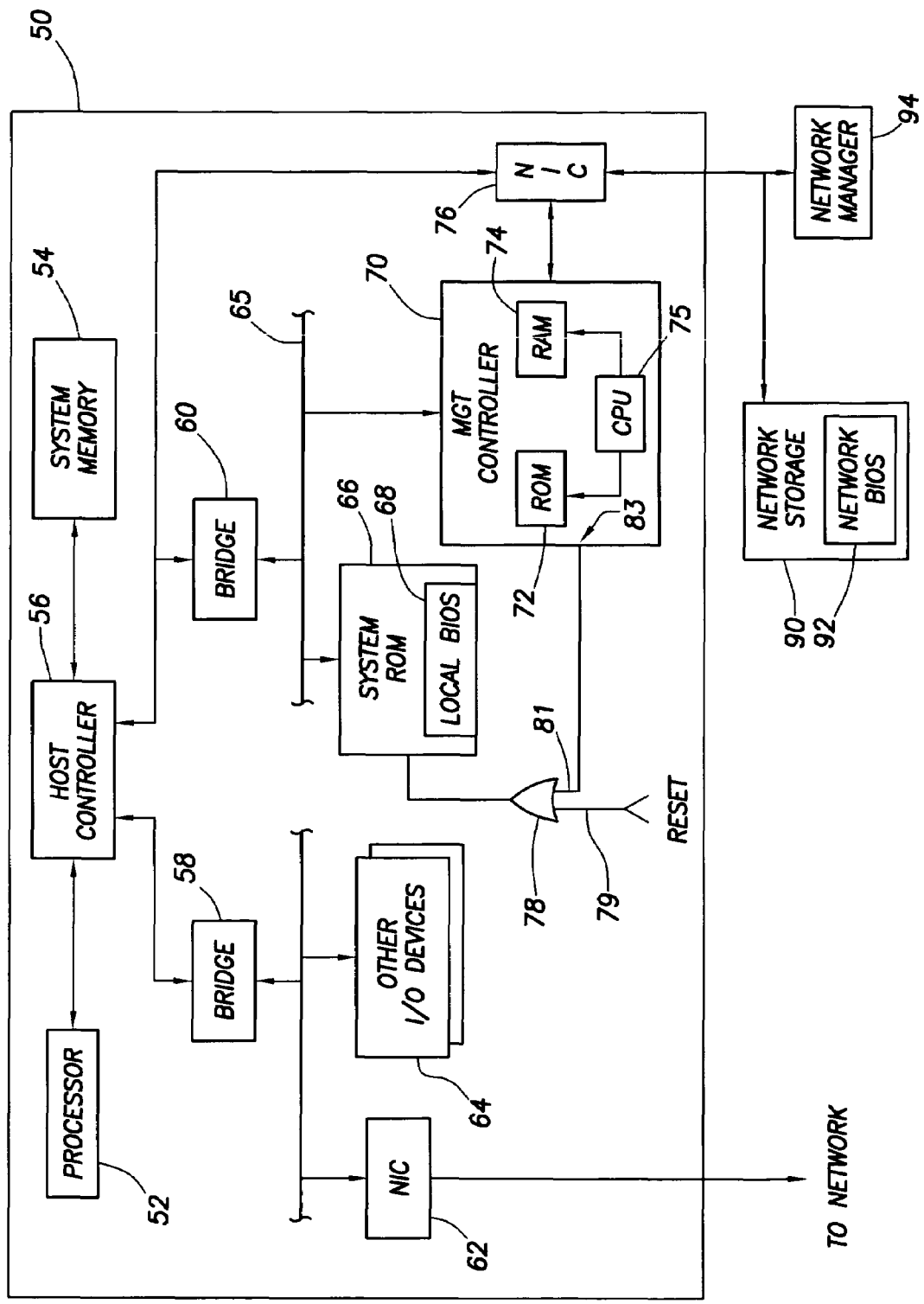
FIG. 1 shows a block diagram of a computer in accordance with various embodiments of the invention in which a management controller emulates a system ROM.

Referring now to FIG. 1, a digital system 50 is shown in accordance with an embodiment of the invention. In the embodiment of FIG. 1, the digital system 50 comprises a computer, but in other embodiments, the digital system may be other than a computer. As shown, computer system 50 comprises a processor 52 and system memory 54 such as random access memory ("RAM") coupled to a host controller 56. A pair of bridges 58 and 60 also couple to the host controller 56. The bridges 58, 60 provide connectivity to other devices in the system. Bridge 58 may couple to a network interface controller ("NIC") 62 and one or more other input/output devices 64 (e.g., keyboard, mouse, storage unit). The NIC 62 may be coupled to an external network to permit the computer system 50 access to a network.

Bridge 60 may couple to a system ROM 66, management controller 70 and a second NIC 76 via a bus 65. The bus 65 may implement any suitable bus protocol such as the Low Pin Count ("LPC") protocol. The system ROM 66 may include executable code and data for use by the system 50. At least one such executable code is a local basic input/output system ("BIOS") 68. The local BIOS 68 comprises code that, when executed by the processor 52, facilitates the initialization of the system 50. The BIOS 68 also may provide code that permits the system to use various input/output device such as the NIC 62, a keyboard, a mouse, or a storage unit (collectively designated as the "other I/O devices" 64).

The system may initialize and operate using the local BIOS 68 contained in the system ROM. Alternatively and as explained below, the management controller 70 may permit the system to initialize and operate using a BIOS that is not contained within the system 50. For example, the network BIOS 92 stored in network storage 90 accessible to the system 50 via NIC 76 may be used instead of local BIOS 68. The management controller 70 may comprise a central processing unit ("CPU") 75 that executes code stored in ROM 72. Thus, some or all of the functionality attributed to the management controller 70 may be implemented by way of executable code executed by the controller's CPU.

In at least some embodiments, the management controller 70 may have its own power source (not specifically shown) that powers the management controller separately from the rest of the system 50. The separate power source may comprise a battery and/or an alternating current ("AC") power supply that provides a separately enabled source of power to the management controller 70. Having a separate power source permits the management controller 70 to be enabled and fully functional despite the rest of the system 50 being disabled and generally non-functional (e.g., powered "off").

The management controller 70 also couples to NIC 76. The NIC 76 may provide the system 50 with connectivity to a network that may be the same as or different from the network to which NIC 62 connects. The NIC 76 may be used to send and receive management control packets, while NIC 62 may be used to send and receive data in accordance with applications that may run on system 50.

The management controller 70 may perform a variety of functions. At least one function implemented by the management controller 70 comprises, with the system 50 otherwise in an "off" state, interacting with the NIC 76 to determine when a management control packet is received into NIC 76 to request that the system transition to an "on" state. As such, an external management entity, such as a network manager 94, can remotely cause the system 50 to initialize.

Another function that may be implemented in the management controller 70 is to permit the system 50 to initialize without using local BIOS 68 and, instead, using network BIOS 92. This emulation capability of management controller 70 may permit the system 50 to avoid having a system ROM 66 at all, although the system ROM 66 can be included if desired. Network BIOS 92 may be the same or different as local BIOS 68. Being contained in network storage 90, network BIOS 92 can readily be edited and/or replaced by a network device such as network manager 94. Network manager 94 may comprise a computer system and be operated by a network administrator. The existence of the network BIOS 92 permits the network manager 94, or other network management entity, to manage the BIOS that is executed in system 50, and moreover, in additional BIOS-based systems, without having to interact with each such BIOS-based system separately to flash the various system ROMs 66. In accordance with an exemplary embodiment of the invention, the ability of the management controller 70 to cause the system to execute network BIOS 92 instead of local BIOS 68 involves maintaining the system ROM in a disabled state to prevent processor 52 from executing the local BIOS 68 and permitting the management controller 70 to emulate the operation of the system ROM 66 to load the network BIOS 92 in a way that is transparent to the processor 52. That is, processor 52 is generally unaware of whether the local BIOS 68 or the network BIOS 92 is being loaded and run in system 50.

Referring still to FIG. 1, an optional logic gate 78 (which may comprise an "OR" gate or other suitable logic gate) receives two input signals and provides an output signal to the system ROM 66. One of the input signals to logic 78 is a "reset" signal 79. The reset signal is asserted to a predetermined state during the initialization process when it is deemed acceptable for the system ROM 66 to begin functioning normally. In accordance with the embodiment of FIG. 1, the reset signal is initially in the logic high state ("1"). The system ROM 66 is adapted to remain disabled while the reset signal is high. At an appropriate time during initialization (e.g., after the system's power supply has stabilized), the reset signal is caused to transition by reset circuitry (not shown) to the logic low state ("0") thereby causing the system ROM to transition from a disabled state to an enabled state. The logic state 78 is included to permit the network BIOS 92 to be run in system 50 or is not included to permit the local BIOS 68 to run in the system 50.

Output signal 83 from management controller 70 is provided as an input signal 81 to OR gate 78 and controls the output signal of the OR gate. Even when the reset signal transitions to a low state, the management controller 79 maintains the system ROM 66 in a reset mode to "emulate" the operation of the system ROM to permit the system 50 to initialize using the network BIOS 90. As noted above, the emulation performed by the management controller 70 generally is transparent to the rest of the system 50. That is, the system 50 may not be aware that the BIOS being executed is network BIOS 92 from an external storage 90 instead of local BIOS 68 system from system ROM 66.

The management controller 70 may be programmed to drive logic 1 on output signal 83 to permit the system 50 to initialize using the network BIOS 92, or may be programmed to drive logic 0 on output signal 83 to permit the system 50 to initialize using the local BIOS 68.

As noted above, the signal on the management controller's input 83 causes the management controller 70 to operate in one of a plurality of modes. In accordance with the embodiment of FIG. 1, a first mode may be specified if the management controller 70 is programmed to drive output signal 83 to be a logic 1. In the first mode, the management controller 70 emulates the system ROM 66 to cause the network BIOS 92, not the local BIOS 68, to be executed by the system's processor 52. A second mode may be specified if the management controller 70 is programmed to drive output signal 83 to be a logic 0. In the second mode, the management controller 70 may not emulate the system ROM 66 thereby permitting the system's processor 52 to execute local BIOS 68, instead of network BIOS 92.

Figure 2:
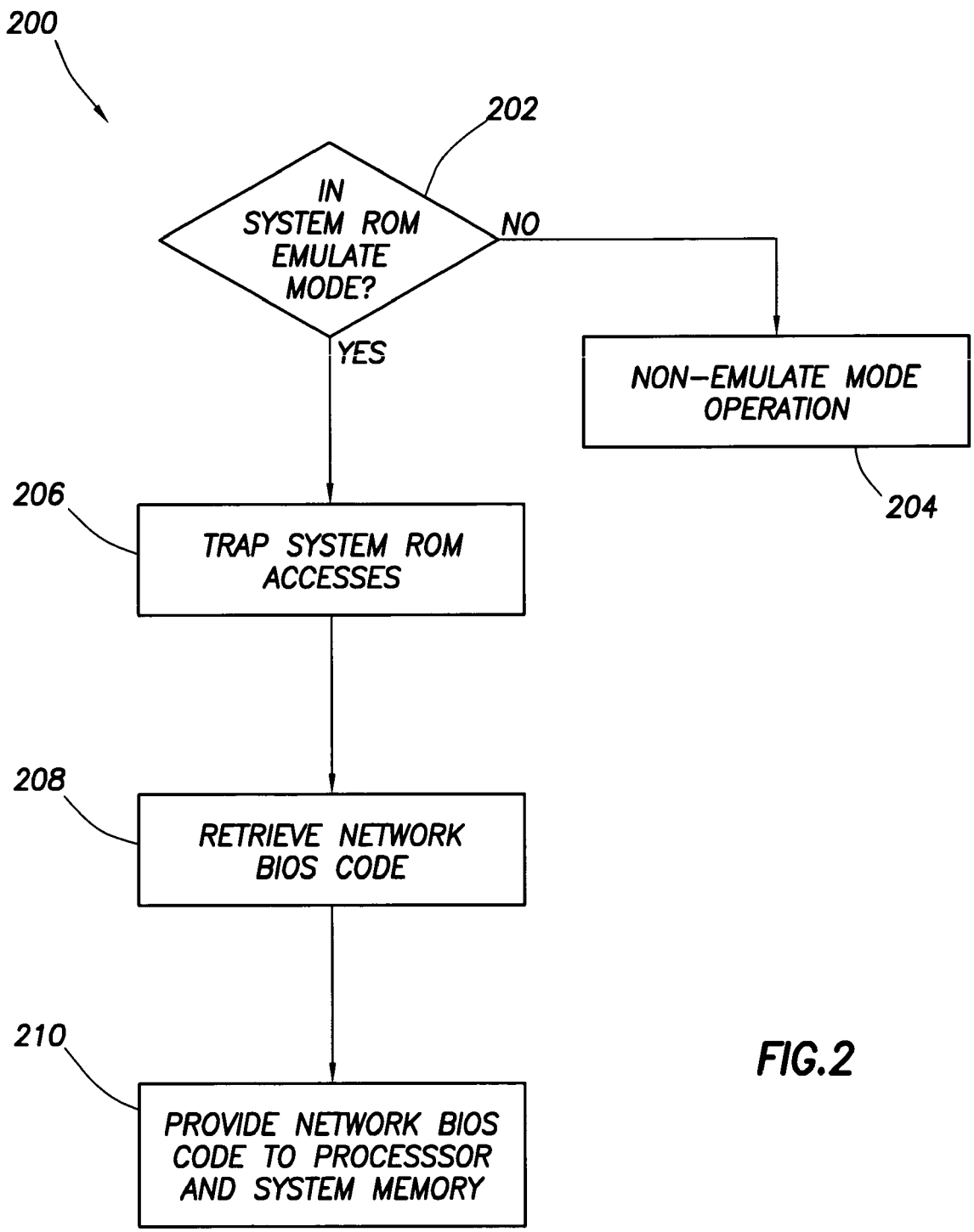
FIG. 2 provides a method implemented in the management controller of FIG. 1.

The first mode (in which the management controller 70 emulates the system ROM 66) will now be described with reference to FIGS. 1 and 2. During initialization of system 50, the management controller 70 is programmed to determine whether the management controller should emulate the system ROM 66 (decision block 202). If the management controller 70 determines that emulation mode is not being specified, then, as indicated by block 204, the management controller enters the second mode that may comprise a non-emulate mode in which the management controller performs any one or more of a variety of other functions (e.g., send and receive management control packets via NIC 76).

If, however, the management controller 70 determines that the first mode is being specified, then control passes to block 206 in which the system management controller "traps" accesses to the system ROM 66. Trapping an access refers to detecting when an entity, such as processor 52, initiates a transaction that targets the system ROM. The system ROM 66 may reside in a memory map at a predetermined address that also is known to the management controller. As such, the management controller 70 monitors bus 65 for transactions that include the address corresponding to the system ROM 66. During the first mode of operation, the system ROM 66 is disabled as described above and thus the system ROM 66 is unable to respond to any transactions targeting the system ROM. Instead, the management controller 70, having detected a transaction targeting the system ROM 66, responds to the transaction as if the management controller 70 was the system ROM 66. In this way, the processor 52 need not be aware of whether the system ROM 66 or the management controller 70 has responded.

The transaction initiated by the processor 52 to the system ROM 66 may comprise a read access by which the processor 52 requests the system ROM to provide one or more instructions for execution by the processor. In the first mode of operation, the management controller 70 causes the requested instructions to be retrieved from the network storage's network BIOS 92 (block 208). In general, the requested instructions are provided from the network storage 90 and through NIC 76, bridge 60 and host controller 56 to the processor 52.

A number of variations on how to provide the network BIOS 92 to the processor are possible. For example, in some embodiments when the management controller 70 receives the first read request for local BIOS 66 from the processor 70, the management controller 70 may respond by signaling the network storage 90 to begin providing the entire network BIOS 92 to the management controller. Thus, the management controller 70 effectively requests, not only the specific instructions being requested by the processor, but also some or all of the remaining instructions in the network BIOS in anticipation of future read requests from the processor for such instructions. Upon retrieval, the network BIOS 92 may be stored in the management controller's RAM 74 pending retrieval by the processor 52. In other embodiments, the management controller 70 requests the network storage 90 to provide only the instructions being requested by the processor 52.

The management controller 70 may need to know or otherwise determine the location of the network BIOS 92 in the network storage device 90. In some embodiments, the management controller 70 may be programmed a priori with the beginning address of the network BIOS 92. Of course, a change to the location of the network BIOS 92 will necessitate a change to management controller's programming to reflect such a change. In other embodiments, the management controller 70 requests the network BIOS 92 location from a suitable network entity such as the network manager 94. The network manager 94 responds to the management controller 70 with the starting location of the network BIOS 92 thereby permitting the management controller to begin retrieving the network BIOS 92.

The management controller 70 also may need to know the size of the network BIOS 92 to ensure that the management controller retrieves the entire network BIOS. The size information may be programmed into the management controller 70 or may be provided to the management controller via the network manager 94.

Once the management controller 70 has retrieved one or more instructions from the network BIOS 92, such instructions may be provided to the requesting processor 52 for execution therein (block 210). As explained above, the processor 52 may not be aware that the instructions originated from the network BIOS.

In some embodiments, the system ROM 66 is installed in the system 50, but disabled as explained above. In other embodiments, the system ROM is not installed in the system 50, but the management controller 70 is configured to emulate the system ROM so that the processor 52 need not be aware of the absence of the system ROM. In this latter embodiment, board space is saved due to the absence of the system ROM 66.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a processor adapted to read BIOS code from a system read only memory ("ROM");
a management controller coupled to said processor; and
a network interface controller coupled to the management controller;
wherein the management controller selectively traps read accesses from the processor that target the system ROM and, in response, causes the network interface controller to load network BIOS code from storage external to the system during system initialization; and
wherein the management controller is selectively configurable to operate in one of a plurality of modes comprising a first mode in which the management controller traps the read accesses and causes the network BIOS code to be loaded and a second mode in which the management controller does not trap read accesses and does not cause the network BIOS code to be loaded.

2. The system of claim 1 further comprising a selection device coupled to the management controller, the selection device indicating whether the management controller is to operate in the first mode or the second mode.

3. The system of claim 2 wherein the system ROM is coupled to the processor and to the selection device, and wherein the selection device causes the system ROM to be disabled while the management controller operates in the first mode and causes the system ROM to be enabled while the management controller operates in the second mode.

4. A management controller, comprising:
a read only memory ("ROM") containing executable code; and
a central processing unit ("CPU") coupled to the ROM and configured to execute the executable code;
wherein the executable code causes the CPU, based on an external signal, to determine if the management controller is to emulate a system ROM and if so, to trap accesses to the system ROM and, when an access to the system ROM is trapped, to cause basic input output system ("BIOS") software stored external to the system ROM to be loaded into and executed by a computer containing the system ROM and the management controller, and
wherein a first state of the external signal causes the management controller's CPU to emulate the system ROM and a second state of the external signal precludes the CPU from emulating the system ROM.

5. The management controller of claim 4 wherein the CPU causes the entire BIOS software stored external to the system ROM to be downloaded to the computer when a first access to the system ROM is trapped.

6. The management controller of claim 4 wherein the CPU causes only a portion of the BIOS software stored external to the system ROM to be downloaded to the computer when a first access to the system ROM is trapped.

7. The management controller of claim 6 wherein the CPU causes additional portions of the BIOS software stored external to the system ROM to be downloaded to the computer when the CPU traps additional accesses to the system ROM.

8. A network, comprising:
a computer that comprises a read only memory ("ROM") on which a local basic input output system ("BIOS") is stored and a management controller coupled to the ROM and to a network interface controller ("NIC");
a network storage device that contains a network BIOS, said network storage device external to the computer and accessible to the computer's management controller via the NIC; and
a network manager coupled to the management controller via the NIC wherein the network manager informs the management controller as to the location of the network BIOS;
wherein the management controller determines whether the management controller is to operate in a first mode or a second mode and, if the management controller is to operate in the first mode, the management controller emulates the computer's ROM and causes the network BIOS to be copied to and executed by the computer instead of the local BIOS.

9. The network of claim 8 wherein the network manager is adapted to change the network BIOS for execution on the computer.

10. The network of claim 8 further comprising a plurality of computers, each computer comprising a ROM on which a local BIOS is stored and a management controller coupled to the ROM and to the network storage device via a NIC, and wherein the network manager is adapted to change the network BIOS for execution on each of the plurality of computers.

11. The network of claim 8 wherein, if the management controller is to operate in the second mode, the management controller does not emulate the computer's ROM and the computer executes the local BIOS from the ROM and not the network BIOS.

12. A system, comprising:
   a processor adapted to read and execute BIOS code from a system read only memory ("ROM"); and
   means for trapping read accesses from the processor to the system ROM and, in response, for causing BIOS code stored external to the system to be downloaded to the system for execution by the processor;
   wherein the means for trapping is selectively configurable to operate in one of a plurality of modes comprising a first mode in which the means for trapping traps the read accesses and causes the BIOS code stored external to the system to be downloaded and a second mode in which the means for trapping does not trap read accesses and does not cause the BIOS code stored external to the system to be downloaded.

13. The system of claim 12 wherein the system also comprises the system ROM and further comprises means for disabling the system ROM.

14. The system of claim 12 further comprising means for selectively causing BIOS code stored on the system ROM to be executed by the processor.

15. A method comprising: determining whether a first mode or a second mode is specified; if the first mode is specified, emulating a system ROM that contains executable BIOS software and, upon trapping an access to the system ROM, downloading and executing executable BIOS software from a storage device external to the system ROM; and if the second mode is specified, precluding the emulating of the system ROM and causing the executable BIOS software contained in the system ROM to be executed.

16. The method of claim 15 further comprising disabling the system ROM if the first mode is specified.

17. The method of claim 15 further comprising gating a reset signal to the system ROM to preclude the system ROM from being released from a reset state if the first mode is specified.

* * * * *